United States Patent
Gray

(10) Patent No.: US 7,163,075 B2
(45) Date of Patent: Jan. 16, 2007

(54) METHOD AND APPARATUS FOR DETECTING THE PRESENCE OF A REAR FACING INFANT SEAT

(75) Inventor: Charles A. Gray, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 381 days.

(21) Appl. No.: 10/884,737

(22) Filed: Jul. 2, 2004

(65) Prior Publication Data
US 2006/0000657 A1    Jan. 5, 2006

(51) Int. Cl.
*B60R 21/015* (2006.01)

(52) U.S. Cl. .................. 180/273; 180/286; 280/735; 280/801.1

(58) Field of Classification Search ........... 180/268, 180/273, 286; 280/735, 801.1, 808; 701/45
See application file for complete search history.

(56) References Cited

U.S. PATENT DOCUMENTS

| | | | |
|---|---|---|---|
| 5,570,903 A | 11/1996 | Meister et al. ............ 280/735 |
| 5,678,854 A | 10/1997 | Meister et al. ............ 280/735 |
| 6,024,378 A | 2/2000 | Fu ............................ 280/735 |
| 6,043,736 A * | 3/2000 | Sawahata et al. .......... 340/438 |
| 6,220,627 B1 | 4/2001 | Stanley ...................... 280/735 |
| 6,255,790 B1 | 7/2001 | Popp et al. |
| 6,279,946 B1 * | 8/2001 | Johnson et al. ............. 280/735 |
| 6,382,667 B1 | 5/2002 | Aoki |
| 6,448,890 B1 * | 9/2002 | Cooper ...................... 340/438 |
| 6,605,877 B1 | 8/2003 | Patterson et al. .......... 307/10.1 |
| 6,662,094 B1 * | 12/2003 | Murphy et al. ............. 701/45 |
| 6,678,600 B1 | 1/2004 | Basir et al. ................. 701/45 |
| 6,682,095 B1 * | 1/2004 | Roychoudhury et al. ... 280/735 |
| 2002/0089159 A1 * | 7/2002 | Fischer et al. ............. 280/740 |
| 2003/0188908 A1 * | 10/2003 | Abe .......................... 180/282 |
| 2005/0057030 A1 * | 3/2005 | Fischer et al. ........... 280/743.2 |
| 2006/0095184 A1 * | 5/2006 | Gray et al. .................. 701/45 |

FOREIGN PATENT DOCUMENTS

FR     2 742 110     6/1997

OTHER PUBLICATIONS

European Search Report dated Aug. 1, 2005.
Anonymous: "Magnetic shield for rear facing infant seat detection", Research Disclosure, Kenneth Mason Publications, Westbourne, GB, vol. 381, No. 26, Jan. 1996. Whole document. XP007120810.

* cited by examiner

*Primary Examiner*—Paul N. Dickson
*Assistant Examiner*—Laura B Rosenberg
(74) *Attorney, Agent, or Firm*—Jimmy L. Funke

(57) ABSTRACT

The presence of a rear-facing infant seat on a motor vehicle seat is reliably and cost-effectively detected based on the buckle state and tension of the seat belt, and the position of the seat belt relative to the seat bight region where the seat bottom and back cushions meet. These seat belt parameters are measured and applied to a predefined decision matrix to detect the presence of a rear-facing infant seat.

10 Claims, 2 Drawing Sheets

| STATE | SYSTEM INPUTS | | | | |
|---|---|---|---|---|---|
| | TENSION | STATUS | POS1 | RFIS PRESENT | DRIVER WARNING |
| 1 | HIGH | BUCKLED | NEAR | YES | NONE |
| 2 | LOW | BUCKLED | NEAR | YES | WARNING1 |
| 3 | HIGH | UNBUCKLED | NEAR | NO | NONE |
| 4 | LOW | UNBUCKLED | NEAR | NO | NONE |
| 5 | HIGH | BUCKLED | FAR | NO | NONE |
| 6 | LOW | BUCKLED | FAR | NO | NONE |
| 7 | HIGH | UNBUCKLED | FAR | NO | NONE |
| 8 | LOW | UNBUCKLED | FAR | NO | NONE | ns
METHOD AND APPARATUS FOR DETECTING THE PRESENCE OF A REAR FACING INFANT SEAT

TECHNICAL FIELD

The present invention relates to characterizing the occupant of a motor vehicle seat for purposes of allowing or suppressing air bag deployment, and more particularly to detecting the presence of a rear-facing infant seat on the vehicle seat.

BACKGROUND OF THE INVENTION

A variety of sensor systems have been developed for characterizing the occupant of a motor vehicle seat to determine whether to allow or suppress air bag deployment. A recurring requirement in this regard is the ability to reliably detect the presence of a rear-facing infant seat (RFIS), since nearly all vehicle manufacturers require that at least the front air bag be disabled in the case of a RFIS due to the proximity of the infant's head to the point of air bag deployment. In the past, the presence of a RFIS has been detected by measuring the occupant's weight distribution on the seat, by the state of the seat belt buckle and the seat belt tension, and/or by measuring the proximity or presence of the occupant relative to the point of deployment or the seat back or the passenger compartment ceiling. See, for example, Fu U.S. Pat. No. 6,024,378, Stanley U.S. Pat. No. 6,220,627, Patterson et al. U.S. Pat. No. 6,605,877 and Basir et al. U.S. Pat. No. 6,678,600. In some systems, the RFIS must be specially equipped with magnets or bar codes that are sensed by Hall sensors or scanners; see, for example, Meister et al. U.S. Pat. Nos. 5,678,854 and 5,570,903. What is needed is a way of simply and reliably detecting the presence of a RFIS without requiring the operator to utilize a specially equipped infant seat.

SUMMARY OF THE INVENTION

The present invention is directed to an improved method and apparatus for reliably and cost-effectively detecting the presence of a RFIS on a motor vehicle seat based on the buckle state and tension of the seat belt, and the position of the seat belt relative to the bight region where the seat back and bottom cushions meet. These seat belt parameters are measured and applied to a predefined decision matrix to detect the presence of a RFIS.

DESCRIPTION OF THE PREFERRED EMBODIMENT

Figure 1:
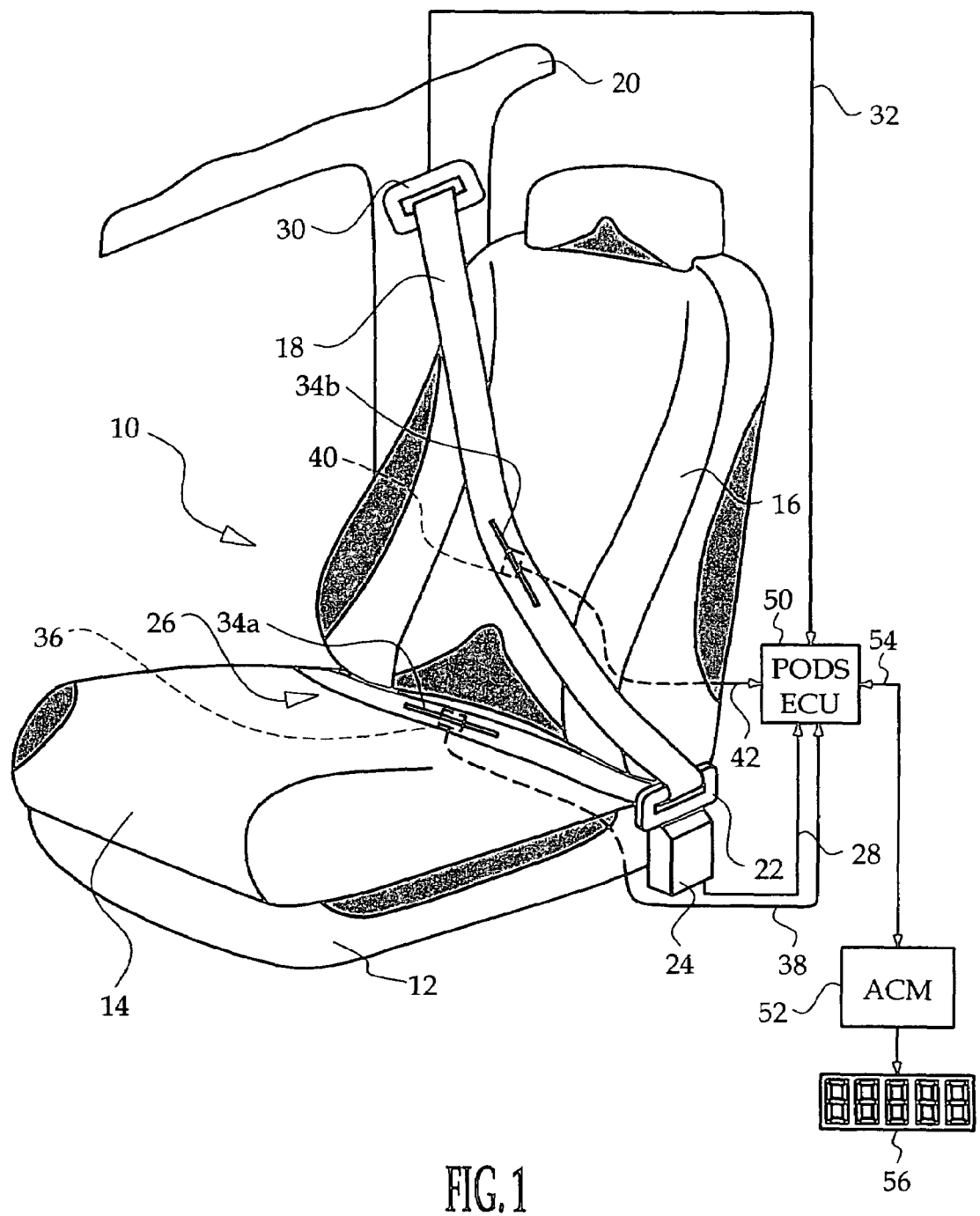
FIG. 1 is a diagram of a vehicle seat, a seat belt, a passive occupant detection system controller, and an air bag control module according to this invention.

Referring to FIG. 1, the vehicle seat 10 is supported on a frame 12, and includes foam cushions 14 and 16 on the seat bottom and back. The seat 10 is equipped with a conventional shoulder/lap seat belt 18 anchored to the vehicle floor (not shown) and B-pillar 20. In use, the belt 18 is drawn around an occupant or through the frame of a child or infant seat, and a clip 22 slidably mounted on the belt 18 is inserted into the buckle 24 to fasten the belt 18 in place. A retractor assembly (not shown) mounted in the B-pillar 20 maintains a desired tension on the belt 18, and locks the belt 18 in place when the vehicle experiences significant deceleration.

According to this invention, the presence of a RFIS on the seat cushion 14 is detected based on the operating state and tension of the seat belt 18, and the position of the seat belt 18 relative to a bight region 26 where the seat bottom and back cushions 14, 16 meet.

The operating state of the seat belt 18—i.e., buckled or un-buckled—is detected by a switch within the buckle 24 that is closes or opens on insertion of the clip 22 into the buckle 24. One side of the switch is connected to an electrical ground or power terminal, while the other side is coupled to the conductor 28 to provide an electrical signal (STATE) indicative of the belt state.

The seat belt tension is detected by a belt tension sensor 30 that may be located in the B-pillar 20 as shown, near the floor on the outboard side of seat 10, or in any other convenient location. The tension sensor 30 may be constructed as disclosed, for example, in the aforementioned U.S. Pat. No. 6,605,877 to Patterson et al., incorporated herein by reference, and produces an electrical signal (TENSION) on line 32 indicative of the seat belt tension. The proximity of the seat belt 18 relative to the bight region 26 is detected magnetically using a seat belt magnetic strip 34a and a first Hall Effect seat sensor 36. The first Hall Effect sensor 36 is disposed in the seat back or bottom cushion 14, 16 in the vicinity of the central portion of the bight region 26, and the magnetic strip 34a is embedded in the fabric of the seat belt 18. When the seat belt 18 is in proximity to the central portion of the bight region 26 as shown in FIG. 1, the strip 34a is magnetically coupled with the sensor 36, and an electrical signal (POS1) produced by sensor 36 on line 38 indicates that the seat belt 18 is near the bight region 26; in other positions of the seat belt 18, there is only weak magnetic coupling between the strip 34a and the sensor 36, and the POS1 signal indicates that the seat belt 18 is disposed away from the bight region 26.

Optionally, a second Hall Effect Sensor 40 is disposed in the middle of the seat back cushion 16, and detects proximity of the seat belt 18 to the seat back cushion 16 by virtue of a magnetic strip 34b embedded in the fabric of the seat belt 18. When the seat belt 18 is in proximity to the back cushion 14 as shown in FIG. 1, the strip 34a is magnetically coupled with the sensor 40, and an electrical signal (POS2) produced by sensor 40 on line 42 indicates that the seat belt 18 is close to the back cushion 16; in other positions of the seat belt 18, there is only weak magnetic coupling between the strip 34b and the sensor 40, and the POS2 signal indicates that the seat belt 18 is disposed away from the back cushion 16. The magnetic strips 34a and 34b may be constituted by individual lap and shoulder portions as shown, or by a single continuous strip of magnetic material if desired. In any event, portions of the seat belt 18 containing the magnetic strips 34a and 34b will be in proximity to the first and second sensors 34 and 40 when a RFIS is present, much the same as when the seat belt 18 is buckled with an empty seat as depicted in FIG. 1; and no part of the seat belt 18 will be in proximity to the sensors 34 or 40 when the seat belt 18 is used to properly secure a normally seated person or a forward-facing infant seat.

The electrical signals on lines 28, 32 and 38 (and optionally, line 42) are provided as inputs to a passive occupant detection system electronic control unit (PODS ECU) 50, which in turn, is coupled to an airbag control module (ACM) 52 via bi-directional communication bus 54. The ACM 52 may be conventional in nature, and operates to deploy one or more airbags or other restraint devices (not shown) for vehicle occupant protection based on acceleration data and occupant characterization data obtained from PODS ECU 50. In general, ACM 52 deploys the restraints if the acceleration signals indicate the occurrence of a severe crash, unless the PODS ECU 50 indicates that a RFIS is present. Also, ACM 52 communicates the suppression status and driver warnings to a driver display device 56.

Figures 2, 3:
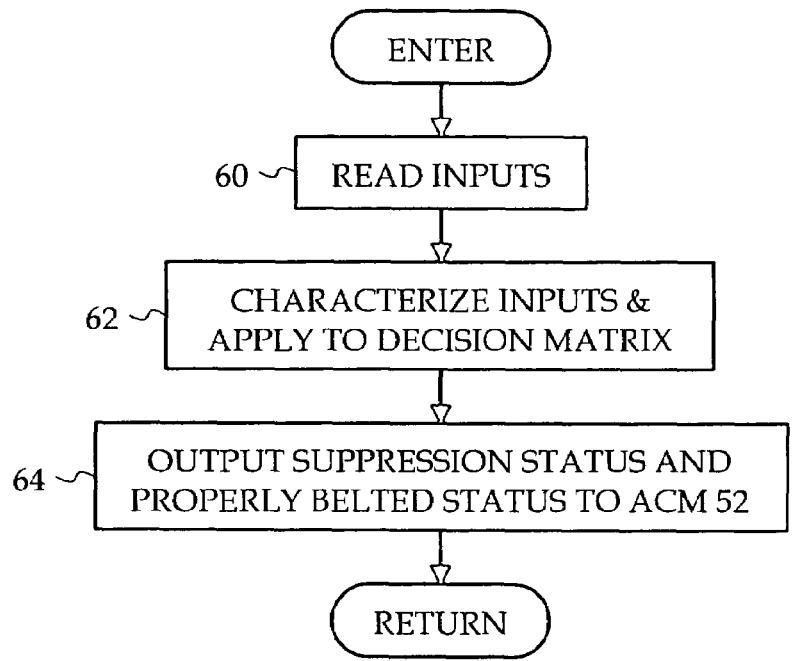
FIG. 2 is a flow diagram representing a software routine executed by the passive occupant detection system controller of FIG. 1 according to this invention.
FIG. 3 is a chart depicting a decision matrix utilized by the software routine of FIG. 2 according to this invention.

In general, the PODS ECU 50 characterizes the inputs on lines 28, 32 and 38 (and optionally, line 42), and applies them to a decision matrix such as depicted by the chart of FIG. 3 to determine if a RFIS is present. The flow diagram of FIG. 2 represents a software routine that is periodically executed by the PODS ECU 50 according to this invention. The block 60 is first executed to read the inputs including the seat belt tension (TENSION), the seat belt status (STATUS), and the seat belt position (POS1). As indicated above and explained below, the inputs may optionally include the position signal POS2. The block 62 then characterizes the analog inputs (TENSION and POS1) by comparing them to various predefined thresholds, and applies the inputs to the decision matrix of FIG. 3. In the illustrated embodiment, TENSION is characterized as being either HIGH (above a tension threshold) or LOW (below the tension threshold), and the position POS1 of the seat belt relative to the bight area of the seat is characterized as being either NEAR (above a proximity threshold) or FAR (below a proximity threshold). The decision matrix of FIG. 3 provides an RFIS PRESENT output (yes or no) and a driver warning output, and the block 64 causes the PODS ECU 50 to supply the outputs to ACM 52. The ACM 52 allows or suppresses air bag deployment based on the supplied outputs, and visually communicates the occupant status and any driver warnings via display 56.

Referring to FIG. 3, the decision matrix of the illustrated embodiment comprehends the eight possible output combinations of TENSION, STATUS and POS1. States 1 and 2 result in a YES condition of the RFIS PRESENT output; in each case, STATUS=BUCKLED and POS1=NEAR. In State 1, TENSION=HIGH, and no driver warning is produced; in State 2, TENSION=LOW, and a driver warning (WARNING1) is produced to indicate that the seat belt tension should be increased in order to properly restrain the infant seat. State 1 can also occur when the seat 10 is occupied by a normally seated person while the seat belt 18 buckled but positioned behind the occupant; accordingly, the driver warning (WARNING1) should be broad enough to encompass either an improperly tensioned infant seat or an improperly restrained but normally seated person. The other states (3–8) result in a NO condition of the RFIS PRESENT output, because STATUS=UNBUCKLED and/or POS1=FAR.

In systems where the seat belt position signal POS2 is provided as an additional input, the decision matrix may detect additional conditions of improper seat belt usage by a normally seated person. For example, an occupant may be utilizing the lap portion of the seat belt 28 properly, with the shoulder portion of the seat belt 28 improperly disposed between the occupant and the seat back cushion 16; in this case, POS1=FAR but POS2=NEAR. If this combination of position inputs occurs while STATUS=BUCKLED, the PODS ECU 50 may issue a suitable driver warning. Another improper condition can also occur when an occupant is improperly sitting on the lap portion of the seat belt 28, with the shoulder portion of the seat belt 28 properly positioned in front of the torso; in this case, POS1=NEAR but POS2=FAR. This has the benefit of distinguishing between an improperly tensioned infant seat and a normally seated but improperly belted occupant.

In summary, the present invention provides a simple and cost-effective way of reliably detecting the presence of a RFIS without requiring special equipment on the infant seat. The addition of the optional seat back belt proximity sensor provides further occupant detection capability, and the ability to distinguish between an improperly tensioned infant seat and a normally seated but improperly belted occupant.

While the present invention has been described with respect to the illustrated embodiment, it is recognized that numerous modifications and variations in addition to those mentioned herein will occur to those skilled in the art. For example, the system may include additional sensors if desired, or a proximity sensor other than a Hall Effect sensor, and so on. Accordingly, it is intended that the invention not be limited to the disclosed embodiment, but that it have the full scope permitted by the language of the following claims.

The invention claimed is:

1. Apparatus for detecting the presence of a rear-facing infant seat on a motor vehicle seat equipped with a seat belt that can be buckled or unbuckled, comprising:
    a seat belt status sensor for determining if the seat belt is buckled;
    a seat belt tension sensor for determining a tension on the seat belt;
    a first seat belt position sensor for detecting a proximity of the seat belt to a bight area of the vehicle seat where bottom and back cushions of the vehicle seat meet; and
    a control unit for detecting the presence of a rear-facing infant seat on the vehicle seat when:
        (1) said seat belt status sensor determines that the seat belt is buckled,
        (2) said seat belt tension sensor determines that said tension is above a predetermined threshold; and
        (3) said first seat belt position sensor detects the proximity of the seat belt to said bight area.

2. The apparatus of claim 1, wherein said control unit detects the presence of an improperly secured rear-facing infant seat on the vehicle seat when:
    (1) said seat belt status sensor determines that the seat belt is buckled,
    (2) said seat belt tension sensor determines that said tension is below said predetermined threshold; and
    (3) said first seat belt position sensor detects the proximity of the seat belt to said bight area.

3. The apparatus of claim 1, wherein said control unit determines that a rear-facing infant seat is not present when:
    (1) said seat belt status sensor does not determine that the seat belt is buckled, or
    (2) said first seat belt position sensor does not detect the proximity of the seat belt to said bight area.

4. The apparatus of claim 1, wherein said first seat belt position sensor comprises:
    a strip of magnetic material attached to said seat belt; and
    a proximity sensor disposed in said vehicle seat in said bight area for detecting the proximity of the strip of magnetic material to said bight area.

5. The apparatus of claim 1, further comprising a second seat belt position sensor for detecting a proximity of the seat belt to a central portion of the back cushion of the vehicle seat, where said control unit distinguishes between said rear-facing infant seat and a normally seated occupant based on said first and second seat belt position sensors.

6. The apparatus of claim 5, wherein said first and second seat belt position sensors comprise:

at least one strip of magnetic material attached to said seat belt;

a first proximity sensor disposed in said vehicle seat in said bight area for detecting the proximity of the strip of magnetic material to said bight area; and a second proximity sensor disposed in the central portion of said back cushion for detecting the proximity of the strip of magnetic material thereto.

7. A method of detecting the presence of a rear-facing infant seat on a motor vehicle seat equipped with a seat belt that can be buckled or unbuckled, comprising the steps of:

determining if the seat belt is buckled;

determining a tension on the seat belt;

detecting a proximity of the seat belt to a bight area of the vehicle seat where bottom and back cushions of the vehicle seat meet; and detecting the presence of a rear-facing infant seat on the vehicle seat when:

(1) said seat belt is determined to be buckled, (2) the determined tension is above a predetermined threshold; and (3) the proximity of the seat belt to said bight area is detected.

8. The method of claim 7, including the steps of:

detecting the presence of an improperly secured rear-facing infant seat on the vehicle seat when:

(1) said seat belt is determined to be buckled, (2) the determined tension is below said predetermined threshold; and (3) the proximity of the seat belt to said bight area is detected.

9. The method of claim 7, wherein the presence of a rear-facing infant seat is not detected when:

(1) said seat belt is not determined to be buckled, or (2) the proximity of the seat belt to said bight area is not detected.

10. The method of claim 7, including the steps of:

detecting a proximity of the seat belt to a central portion of the back cushion of the vehicle seat, and distinguishing between an infant seat and a normally seated occupant based on the detected proximity of said seat belt to said bight area and said back cushion.

* * * * *